(12) United States Patent
Cutler

(10) Patent No.: US 7,812,882 B2
(45) Date of Patent: Oct. 12, 2010

(54) CAMERA LENS SHUTTERING MECHANISM

(75) Inventor: Ross G. Cutler, Duval, WA (US)

(73) Assignee: Microsoft Corporation, Redmond, WA (US)

(*) Notice: Subject to any disclaimer, the term of this patent is extended or adjusted under 35 U.S.C. 154(b) by 712 days.

(21) Appl. No.: 11/027,146

(22) Filed: Dec. 30, 2004

(65) Prior Publication Data
US 2006/0146177 A1 Jul. 6, 2006

(51) Int. Cl.
H04N 7/00 (2006.01)
H04N 5/225 (2006.01)

(52) U.S. Cl. .......................... 348/373; 348/36
(58) Field of Classification Search ............. 348/36–39, 348/143, 144, 146, 152, 153, 159, 373–376
See application file for complete search history.

(56) References Cited

U.S. PATENT DOCUMENTS

| 3,118,340 | A | 1/1964 | Iwerks |
|---|---|---|---|
| 5,539,483 | A | 7/1996 | Nalwa |
| 5,745,305 | A | 4/1998 | Nalwa |
| 5,793,527 | A | 8/1998 | Nalwa |
| 5,990,934 | A | 11/1999 | Nalwa |
| 6,111,702 | A | 8/2000 | Nalwa |
| 6,115,176 | A | 9/2000 | Nalwa |
| 6,128,143 | A | 10/2000 | Nalwa |
| 6,141,145 | A | 10/2000 | Nalwa |
| 6,144,501 | A | 11/2000 | Nalwa |
| 6,175,454 | B1 | 1/2001 | Hoogland et al. |
| 6,195,204 | B1 | 2/2001 | Nalwa |
| 6,219,090 | B1 | 4/2001 | Nalwa |
| 6,222,683 | B1 | 4/2001 | Hoogland et al. |
| 6,285,365 | B1 | 9/2001 | Nalwa |
| 6,313,865 | B1 | 11/2001 | Driscoll, Jr. et al. |
| 6,341,044 | B1 | 1/2002 | Driscoll, Jr. et al. |
| 6,356,296 | B1 | 3/2002 | Driscoll, Jr. et al. |
| 6,356,397 | B1 | 3/2002 | Nalwa |
| 6,373,642 | B1 | 4/2002 | Wallerstein et al. |
| 6,388,820 | B1 | 5/2002 | Wallerstein et al. |
| 6,392,687 | B1 | 5/2002 | Driscoll, Jr. et al. |

(Continued)

FOREIGN PATENT DOCUMENTS

EP 1377041 1/2004

(Continued)

OTHER PUBLICATIONS

EP Search Report Ref EP37006TE900peu, for Application No. 05111769.5-2223, mailed Apr. 12, 2006.

(Continued)

Primary Examiner—Timothy J Henn
(74) Attorney, Agent, or Firm—L. Alan Collins; Collins & Collins Incorporated

(57) ABSTRACT

A camera lens shuttering mechanism includes an image conducting unit disposed within a shutter housing when the camera is in a closed position so that the camera cannot record images. When moved to an open position, the shutter housing does not block the image conducting unit from imaging objects. The image conducting unit may be one or more lenses or one or more mirrors that reflect images to one or more lenses. When in the closed position, it is apparent to users that the camera is unable to transmit images.

15 Claims, 4 Drawing Sheets

U.S. PATENT DOCUMENTS

| | | | |
|---|---|---|---|
| 6,426,774 B1 * | 7/2002 | Driscoll et al. | 348/335 |
| 6,700,711 B2 | 3/2004 | Nalwa | |
| 6,924,838 B1 * | 8/2005 | Nieves | 348/211.99 |
| 7,071,964 B1 * | 7/2006 | Glatt | 348/36 |
| 7,116,351 B2 * | 10/2006 | Yoshikawa | 348/36 |
| 2002/0034020 A1 | 3/2002 | Wallerstein et al. | |
| 2002/0078034 A1 | 6/2002 | Cho | |
| 2002/0154417 A1 | 10/2002 | Wallerstein et al. | |
| 2004/0008423 A1 * | 1/2004 | Driscoll et al. | 359/725 |
| 2004/0021764 A1 | 2/2004 | Driscoll, Jr. et al. | |
| 2004/0095500 A1 | 5/2004 | Sato et al. | |
| 2004/0263611 A1 * | 12/2004 | Cutler | 348/36 |
| 2005/0041094 A1 * | 2/2005 | Gal et al. | 348/36 |

FOREIGN PATENT DOCUMENTS

| | | |
|---|---|---|
| EP | 1583353 | 10/2005 |
| JP | 1996125835 A | 5/1996 |
| JP | 10075287 | 3/1998 |
| WO | WO 9847291 | 10/1998 |
| WO | WO 9930197 | 6/1999 |
| WO | WO 0050967 | 8/2000 |
| WO | WO 0120518 | 3/2001 |
| WO | WO 2004/112290 | 12/2004 |
| WO | WO 2005/002201 | 1/2005 |

OTHER PUBLICATIONS

EP Search Report Ref EP36474RK900kja, for Appliation No. 05109477.9-2201, mailed Jun. 1, 2006.

* cited by examiner

CAMERA LENS SHUTTERING MECHANISM

TECHNICAL FIELD

The following description relates generally to cameras. More particularly, the following description relates to mechanisms for shuttering one or more optical components in a camera.

BACKGROUND

Most cameras include a shutter that is operably closeable over a camera lens when the camera is not in use so that the camera lens is protected from undesirable contact that may damage the lens and from dust and dirt that may deposit on the lens and interfere with the quality of video or photographs produced by the camera.

Shuttering mechanisms are also employed in some types of cameras for privacy concerns. In a type of camera that is designed to remain operational with a low profile for extended periods of time, such as in a conference room video camera, a shuttering mechanism is desirable so that conference participants can be confident that their privacy is protected at times when they would not expect the camera to be transmitting audio and/or video.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
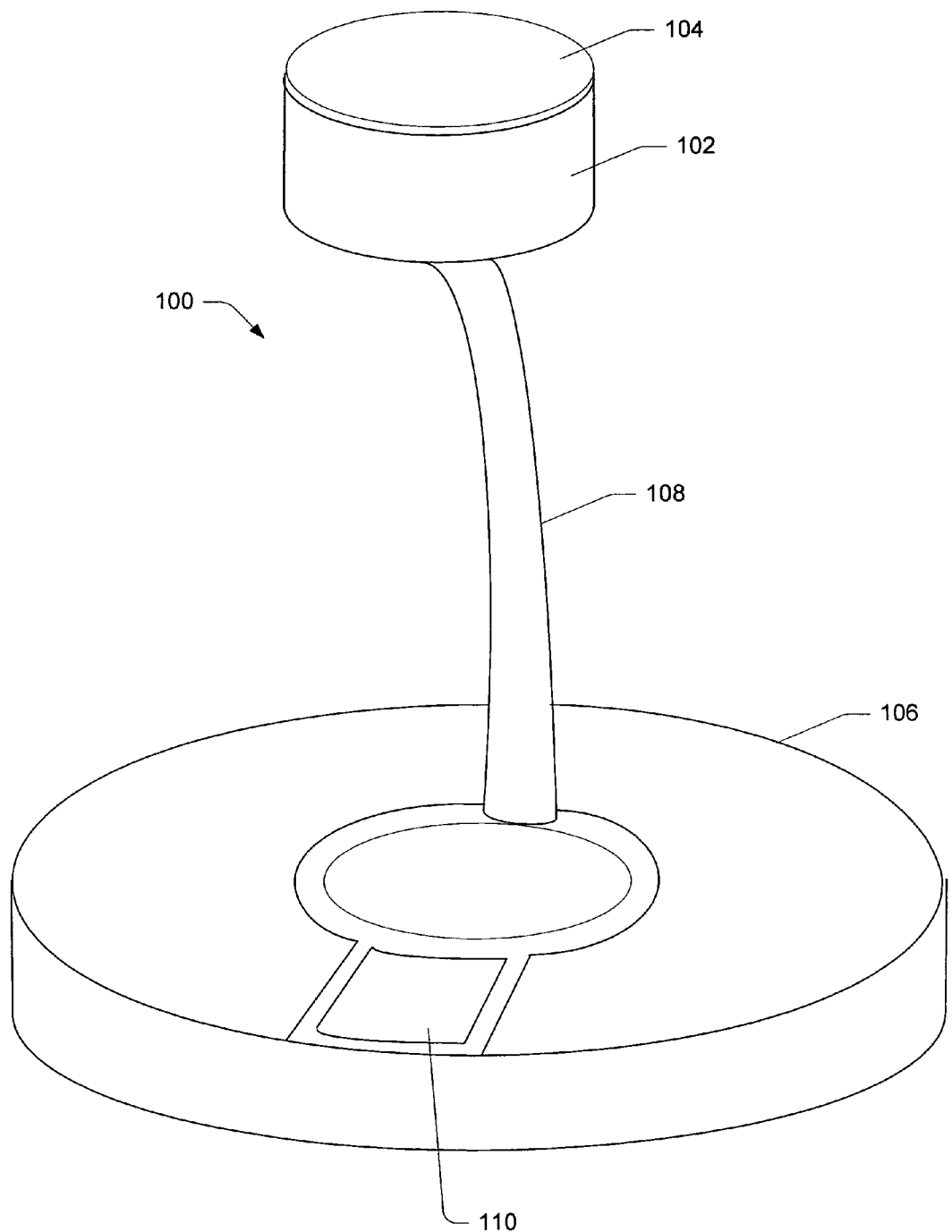
FIG. 1 depicts an exemplary camera having a shutter housing.

Most cameras include some type of shuttering mechanism that is designed to protect a camera lens (or sensor, mirror, etc.) when the camera is not in use. Typically, such a shuttering mechanism includes a moveable shutter that is disposed over the camera lens when the camera is not in use. When the camera is operational, the shutter is repositioned so that the shutter does not occlude the camera's view.

In certain types of cameras, particularly conference room video cameras, web cameras and the like, a shuttering mechanism can serve an additional purpose. In such cameras, a shutter can server to optically occlude a lens portion of the camera so that persons in view of the camera are assured of privacy at certain times. In other words, it is clear to persons in the same room as the camera that the camera is in a non-operational mode.

Cameras that image a wide area utilize one or more lenses that cover a broad view. It is not a simple matter to open and close a shuttering mechanism over such a wide area lens. Particularly problematic are panoramic cameras that image a 360 degree view. In such a configuration, there is no place to position a typical shutter that can be extended over or withdrawn from covering a lens, since there is no lateral area that is off image.

The present disclosure describes a camera shuttering mechanism for a conference room type camera. In the examples shown and described below, a 360 degree panoramic camera is described that includes a shutter housing. The shutter housing encloses an image conducting unit that can be moved between a closed position and an open position.

In the closed position, the image conducting unit is covered sufficiently by the shutter housing to prevent a camera from sampling an image. In the open position, the image conducting unit protrudes from the shutter housing sufficient to allow the camera to sample an image.

The image conducting unit can be any apparatus that is used by the camera to redirect or focus light waves from an object onto one or more camera sensors which capture an image of the object. The image conducting unit may include one or more camera lenses that are positioned within the shutter housing when the camera is not in use. When the camera is operational, the one or more camera lenses are repositioned away from the shutter housing so that light waves from an object pass through the one or more lenses to one or more imaging sensors.

In an alternative configuration, the image conducting unit comprises a mirror assembly that is used to reflect light waves from an object to one or more lenses. The lenses focus the light waves on one or more imaging sensors to create an image of the object. In a closed position, the mirror assembly is covered by the shutter housing so that light waves are blocked from being reflected by the mirror assembly to the lenses. When open, the mirror assembly extends outward from the shutter housing so that light waves are reflected by the mirror assembly to the lenses.

Exemplary implementations and configurations will be described in greater detail below. In the exemplary implementations and configurations, certain attributes of the described shuttering mechanism will become apparent. One attribute is that the shuttering mechanism provides optical occlusion of a camera video component so that users can clearly see that the camera is not imaging them when the camera is not in use. Another attribute is that the shuttering mechanism protects camera components (e.g. lenses, mirrors, sensors, etc.) when the camera is not in use. Additionally, as described herein, operational camera height is decreased when the shuttering mechanism is closed. Other attributes of particular configurations will become clear as the discussion progresses.

Exemplary Panoramic Camera With Shutter Housing

FIG. 1 depicts an exemplary camera 100 in accordance with the present description. The exemplary camera 100 includes a shutter housing 102 and a shutter housing cover 104. The shutter housing 102 is connected to a camera base 106 by a support column 108.

A user interface unit 110 is included in the exemplary camera 100 and provides input from a user and/or output to a user in the form of buttons, sliders, displays, keys, pads, and the like. The camera base 106 houses hardware and software components (not shown) that provide functionality to the exemplary camera 100. An electronic connection (not shown) is provided via the support column 108 to one or more electronic components (not shown) located within the shutter housing 102 of the exemplary camera 100.

Configurations similar to the exemplary camera 100 are shown and described in relation to subsequent figures.

Although particular exemplary configurations are shown and described to provide a working knowledge of the subject matter claimed herein, it is noted that other configurations may be implemented that differ from the exemplary configurations included herein without departing from the scope of the subject matter presently disclosed and claimed.

Exemplary Panoramic Photographic Device

Figure 2:
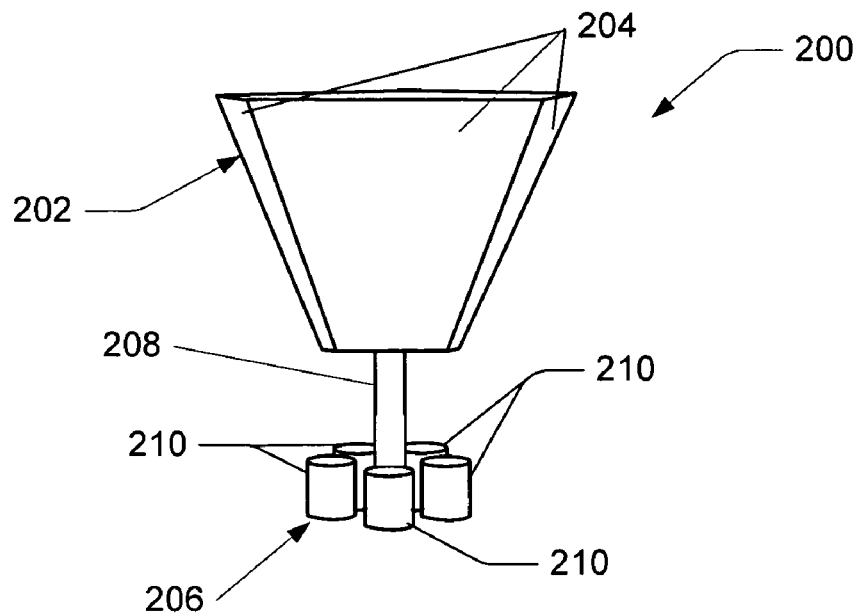
FIG. 2 is a depiction of an exemplary panoramic photographic device that utilizes an inverted pyramidal mirror and multiple cameras.

FIG. 2 is a depiction of an exemplary panoramic photographic device 200 in accordance with the present description. The exemplary panoramic photographic device 200 includes a mirror assembly 202 that includes multiple mirror facets 204. Although other configurations may be used, the mirror assembly 202 example shown in FIG. 2 comprises an inverted pyramidal configuration. The mirror assembly 202 is disposed over a lens assembly 206 by a support column 208.

The lens assembly 206 is comprised of one or more individual lenses 210. There is one lens 210 for each mirror facet 204. Light waves are reflected from an object to the lenses 210 by the mirror facets 204. As a result, a near center of projection is realized by the exemplary panoramic photographic device 200.

Although the shuttering mechanisms shown and described herein function particularly well when used in conjunction with a device configuration as shown in FIG. 2, the described techniques function with other camera configurations. The particular configuration of the exemplary panoramic photographic device 200 is shown by way of example and not by way of limitation.

Exemplary Shutter Housing Apparatus

Figure 3:
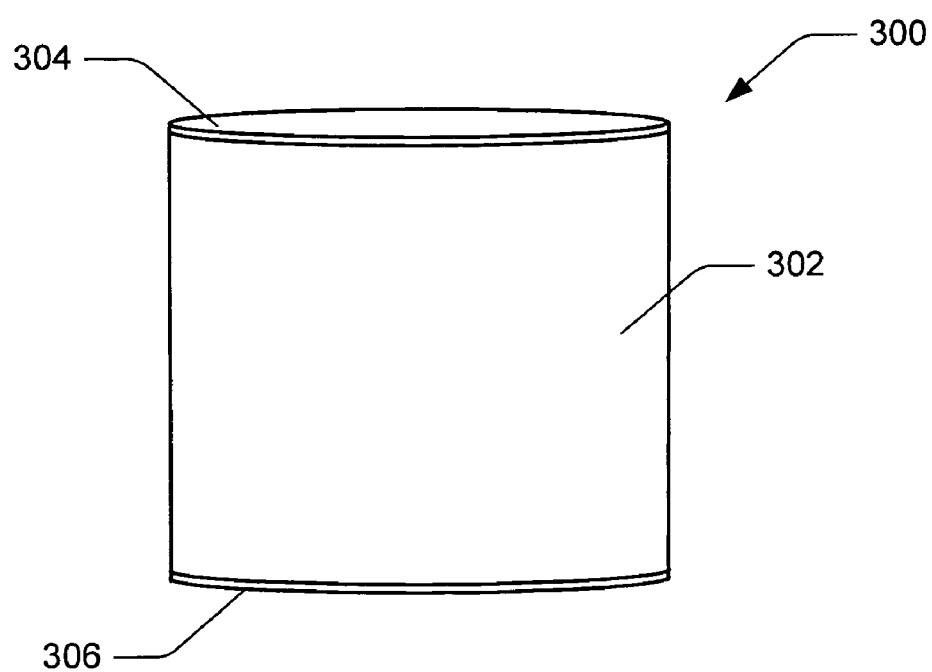
FIG. 3 depicts an exemplary shutter housing apparatus.

FIG. 3 depicts an exemplary shutter housing apparatus 300 in accordance with the present description. In the following description, continuing reference is made to the elements and reference numerals shown in FIG. 2.

The exemplary shutter housing apparatus 300 includes a shutter housing 302 that is configured to surround a camera lens assembly or a mirror assembly (FIG. 2, 202). The exemplary shutter housing apparatus 300 also includes a shutter housing cover 304 and a shutter housing floor 306.

Although the exemplary shutter housing apparatus 300 is shown having a shutter housing cover 304 and a shutter housing floor 306, it is noted that the shutter housing cover 304 and/or the shutter housing floor 306 are optional. The functionality of the shutter housing 302 may be accomplished in a configuration that does not include the shutter housing cover 304 and/or the shutter housing floor 306. However, there may be certain advantages to using the shutter housing cover 304 and/or the shutter housing floor 306.

Utilization of the shutter housing cover 304 and/or the shutter housing floor 306 can help provide protection to camera components by preventing dust or particulate matter from coming in contact with camera components or by preventing potentially damaging contact with the camera components.

The shutter housing 302 as shown provides a continuous 360 degree sheet of material that may be disposed about a lens assembly or a mirror assembly (as is shown and described in greater detail below). The shutter housing cover 304 communicates with the shutter housing 302 when disposed in a closed position as shown. When in the closed position, an area surrounded by the shutter housing 302 is covered by the shutter housing cover 304.

The shutter housing floor 306 communicates with the shutter housing 302 to enclose the area surrounded by the shutter housing 302 from underneath. The area surrounded by the shutter housing 302 is thereby completely enclosed when the shutter housing cover 304 is disposed in the closed position.

Further aspects of the shutter housing apparatus 300 are described in greater detail below, with respect to subsequent figures.

Exemplary Photographic Device

Figure 4A:
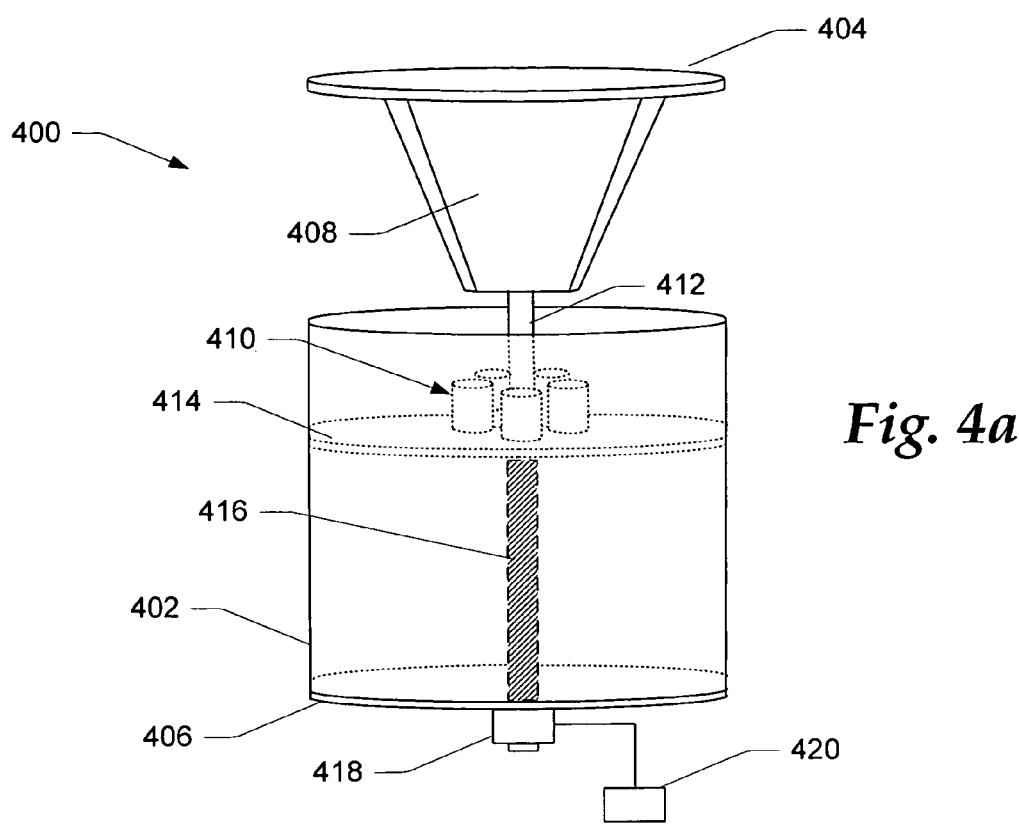
FIG. 4a is a depiction of an exemplary panoramic photographic device and a shutter housing disposed in an open position.

FIG. 4a is a depiction of an exemplary panoramic photographic device 400 in accordance with the present description. In the following description, continuing reference is made to elements and reference numerals shown in one or more previous figures.

The exemplary panoramic photographic device 400 includes a shutter housing 402 similar to the shutter housing 302 shown in FIG. 3. The shutter housing 402 includes a shutter housing cover 404 and a shutter housing floor 406. The exemplary panoramic photographic device 400 also includes a mirror assembly 408 disposed over a lens assembly 410 and supported by a support column 412.

The lens assembly 410 and support column 412 are situated on a lens assembly floor 414 which is moveable within the shutter housing 402. A positioning mechanism 416 is disposed between the shutter housing floor 406 and the lens assembly floor 410 and is configured to raise and lower the lens assembly floor 406. The positioning mechanism 416 may be a drive screw, a telescoping pneumatic, a magnetic lifting device, a hydraulic column, or any mechanism that may be activated to raise and lower the lens assembly floor 410.

In the present example, the positioning mechanism 416 is an electric screw drive and, therefore, an electric motor 418 connected to an electrical power source 420 provides the electrical power required to drive the positioning mechanism 416.

As the lens assembly floor 414 is disposed further away from the shutter housing floor 406, the lens assembly 410, support column 412, mirror assembly 408 and shutter housing cover 404 move with the lens assembly floor 414 so that at least the shutter housing cover 404 and the mirror assembly 408 are disposed outside the shutter housing 402. In this position (i.e. an open position), light waves are not blocked from reflecting off of the mirror assembly 408 to the lens assembly 410 and images of objects can be captured.

It is noted that a transparent cylindrical secondary shutter housing (not shown) may also be included in the exemplary panoramic photographic device 400. Such a secondary shutter housing would protect the mirror assembly 408 and the lens assembly 410 from damage and contamination from dust, fingerprints, etc.

The secondary shutter housing (not shown) would surround the mirror assembly 408 and would have a diameter slightly less than a diameter of the shutter housing 402 so that it would remain protective of the mirror assembly 408 when the mirror assembly 408 moved in and out of the shutter housing 402.

Figure 4B:
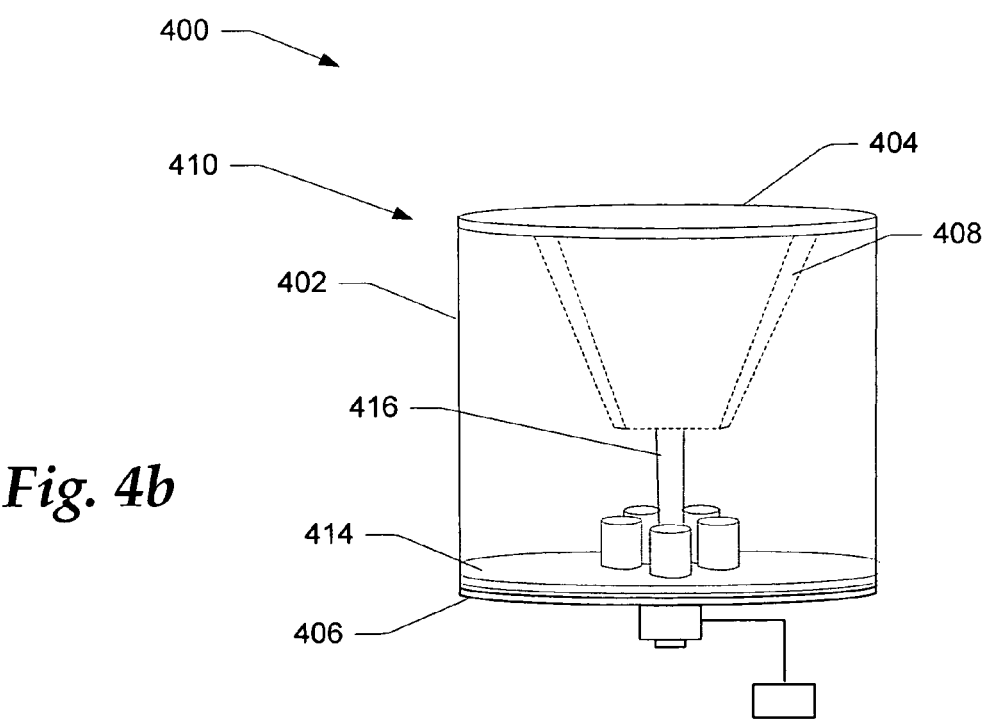
FIG. 4b is a depiction of an exemplary panoramic photographic device and a shutter housing disposed in a closed position.

FIG. 4b depicts the exemplary panoramic photographic device 400 disposed in a closed position. In the closed position, the lens assembly floor 414 is disposed close to or next to the shutter housing floor 406 so that the lens assembly 410, the support column 412, the mirror assembly 408 and the shutter housing cover 404 are positioned within the shutter housing 402. In the closed position, the mirror assembly 408 is in a position such that light waves are occluded from being reflected to the lens assembly 410. As a result, no images can be recorded when the exemplary panoramic photographic device 400 is in the closed position.

When the shutter housing cover 404 is used in a particular configuration, the shutter housing cover 404 communicates with the shutter housing 402 when in the closed position to protect camera components from dust and contact. This also provides a more aesthetically pleasing configuration and provides assurance to users that the photographic device 400 cannot record images when the users have de-activated the photographic device.

Exemplary Photographic Device and Shutter Housing

Figure 5:
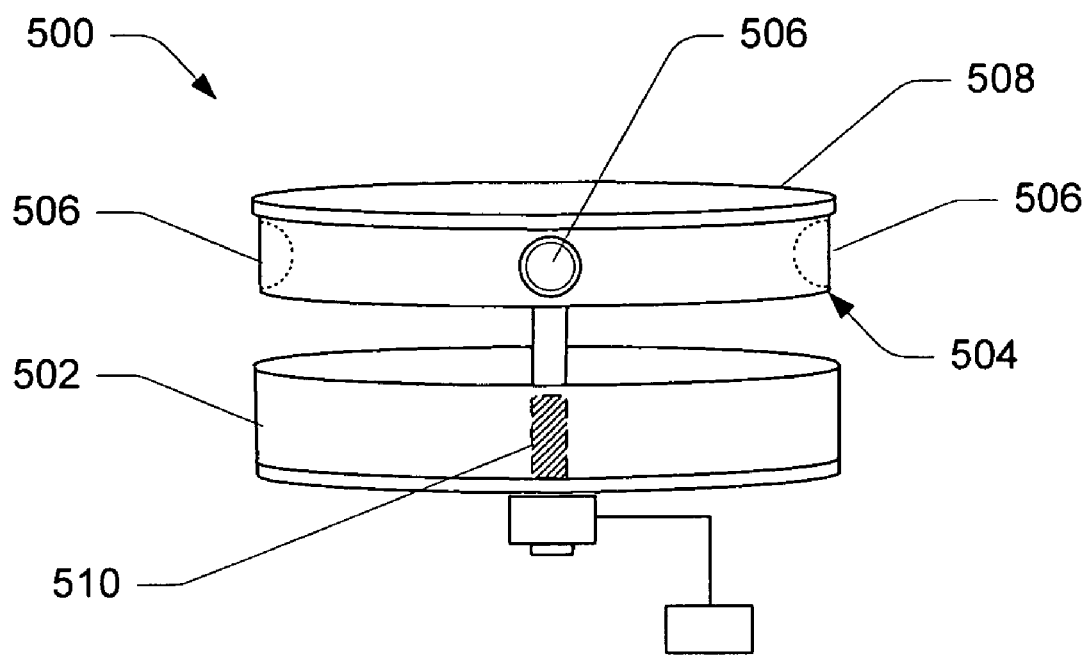
FIG. 5 is a depiction of an exemplary panoramic photographic device and shutter housing.

FIG. 5 depicts another implementation of an exemplary panoramic photographic device 500 having a shutter housing 502 in accordance with the present description. In the following discussion, continuing reference is made to elements and reference numerals shown in previous figures.

The exemplary panoramic photographic device 500 also includes a lens assembly 504 that has one or more lenses 506. In the present example, the exemplary panoramic photographic device 500 includes four lenses 506 positioned in a 360 degree configuration in the lens assembly 504.

A shutter housing cover 508 is positioned on top of the lens assembly 504 and is configured to communicate with the shutter housing 502 when the exemplary photographic device 502 is disposed in a closed position (not shown). In the closed position, the lenses 506 are occluded by the shutter housing 502 so the lenses cannot image objects. In open position as shown, the shutter housing cover 508 and the lens assembly 504 are disposed away from the shutter housing 502 so that light waves reflecting off of objects can be imaged through the lenses 506.

The lens assembly 504 is supported by a positioning mechanism/support column 510 which moves up and down to dispose the lens assembly 504 and shutter housing cover 508 between the open position and the closed position.

Although the lens assembly 504 is shown in this and other examples presented herein as being repositioned between an open position and a closed position relative to a fixed shutter housing 502, it is noted that in at least one implementation, the shutter housing 502 is repositioned relative to a fixed lens assembly 504 to effect a transition between the open position and the closed position.

CONCLUSION

While one or more exemplary implementations have been illustrated and described, it will be appreciated that various changes can be made therein without departing from the spirit and scope of the claims appended hereto.

The invention claimed is:

1. A camera, comprising:
an image conducting unit configured to receive light waves reflected off an object and to conduct the light waves on to two or more image forming sensors, wherein the image conducting unit comprises a mirror assembly including two or more mirrors, each of the two or more mirrors operable to conduct at least a portion of the light waves to a unique one of two or more lenses of a lens assembly, the mirror assembly configured in an inverted pyramidal configuration;
a shutter housing including a movable shutter housing cover and a shutter housing floor that, when disposed together in a closed position, completely enclose and protect the image conducting unit and the two or more lenses of the lens assembly and the two or more image forming sensors from damaging contact with objects distinct from the camera, wherein the shutter housing floor is connected to a bottom of the shutter housing and is configured to enclose the bottom of the shutter housing, and wherein the movable shutter housing cover, when disposed in the closed position, is connected to a top of the shutter housing and is configured to enclose the top of the shutter housing;
a movable lens assembly floor coupled to a bottom of the image conducting unit with the two or more lenses of the lens assembly coupled to the lens assembly floor, each of the two or more lenses configured to conduct at least a portion of the light waves to a corresponding unique one of the two or more image forming sensors;
a transparent secondary shutter housing within configured to surround the image conducting unit and the two or more lenses of the lens assembly and the two or more image forming sensors, the transparent secondary shutter housing configured to fit within the shutter housing including the movable shutter housing cover and the shutter housing floor when together in the closed position, and the transparent secondary shutter housing configured to conduct the received light waves to the image conducting unit and configured to protect the image conducting unit and the two or more lenses of the lens assembly and the two or more image forming sensors from damaging contact with the objects distinct from the camera when the shutter housing including the movable shutter housing cover and the shutter housing floor are positioned in an open position; and
a positioning mechanism configured to position the image conducting unit via the movable lens assembly floor between the open position in which the image conducting unit is not occluded by the shutter housing from receiving light waves to the closed position in which the shutter housing occludes the image conducting unit from receiving light waves.

2. The camera as recited in claim 1, wherein the two or more lenses are configured to image an area of at least 180 degrees.

3. The camera as recited in claim 1, wherein the two or more lenses are configured to image an area of 360 degrees.

4. The camera as recited in claim 1, wherein the positioning mechanism further comprises one of the following: a screw drive; a hydraulic lifting device; a pneumatic lifting device; a magnetic lifting device.

5. The camera as recited in claim 1, wherein the positioning mechanism is further configured to reposition the shutter housing.

6. A camera, comprising:
a shutter housing;
a movable lens assembly floor coupled to the bottom of an image transferring assembly;
a transparent secondary shutter housing configured to protect and surround the image transferring assembly, the transparent secondary shutter housing configured to fit within the shutter housing and configured to protect the image conducting unit from damaging contact with objects distinct from the camera;
a movable shutter housing cover;
the image transferring assembly configured to transfer an image of an object onto two or more sensors when disposed in a first position, and being positionable to a second position in which the shutter housing blocks the image from the image transferring assembly and in which the shutter housing and the movable lens assembly floor and a shutter housing floor and the movable shutter housing cover are disposed together in a closed position completely enclosing the image transferring assembly, wherein the shutter housing floor is connected to a bottom of the shutter housing and is configured to enclose the bottom of the shutter housing, and wherein the movable shutter housing cover, when disposed in the closed position, is connected to a top of the shutter housing and is configured to enclose the top of the shutter housing; and a positioning mechanism configured to move the image transferring assembly via the movable lens assembly floor between the first position and the second position.

7. The camera as recited in claim 6, wherein the image transferring assembly further comprises two or more lenses.

8. The camera as recited in claim 6, wherein the image transferring assembly further comprises two or more mirrors.

9. The camera as recited in claim 6, wherein the shutter housing surrounds the image transferring assembly when the image transferring assembly is disposed in the second position.

10. A camera, comprising:

a shutter housing;

a movable lens assembly floor coupled to the bottom of the camera;

a movable shutter housing cover;

an image conducting unit configured to transmit an object image to two or more image sensors when the camera is disposed in a first position, the image conducting unit being blocked from transmitting the object image when the camera is disposed in a second position in which the shutter housing and the movable lens assembly floor and a shutter housing floor and the movable shutter housing cover are disposed together in a closed position completely enclosing the image conducting unit, wherein the shutter housing floor is connected to a bottom of the shutter housing and is configured to enclose the bottom of the shutter housing, wherein the shutter housing floor is connected to a bottom of the shutter housing and is configured to enclose the bottom of the shutter housing, and wherein the movable shutter housing cover, when disposed in the closed position, is connected to a top of the shutter housing and is configured to enclose the top of the shutter housing;

a transparent secondary shutter housing protecting the image conducting unit surrounding the image conducting unit and the two or more image sensors, the transparent secondary shutter housing configured to fit within the shutter housing when in the second position and configured to protect the image conducting unit and the two or more image sensors from damaging contact with objects distinct from the camera when in the first position;

a positioning mechanism configured to dispose the camera via the movable lens assembly floor between the first position and the second position; and wherein the image conducting unit is completely enclosed within the shutter housing when the camera is disposed in the second position but is positioned at least partially outside of the shutter housing when the camera is disposed in the first position.

11. The camera as recited in claim 10, wherein the image conducting unit further comprises two or more camera lenses.

12. The camera as recited in claim 10, wherein the image conducting unit further comprises two or more mirrors.

13. The camera as recited in claim 10, wherein the image conducting unit is disposed above the shutter housing in the first position.

14. The camera as recited in claim 10, wherein:

the image conducting unit and the movable lens assembly floor are situated in a fixed position; and the shutter housing is repositionable relative to the image conducting unit to effect the first position and the second position.

15. The camera as recited in claim 14, wherein the shutter housing is further configured to drop down in relation to the image conducting unit when transitioning from the second position to the first position.

* * * * *